United States Patent [19]
Crostack

[11] 4,271,705
[45] Jun. 9, 1981

[54] METHOD AND DEVICE FOR GENERATING ACOUSTIC PULSES

[75] Inventor: Horst-Artur Crostack, Dortmund, Fed. Rep. of Germany

[73] Assignee: Karl Deutsch Prüf-und Messgeräte, Wuppertal, Fed. Rep. of Germany

[21] Appl. No.: 97,832

[22] Filed: Nov. 26, 1979

Related U.S. Application Data

[63] Continuation of Ser. No. 922,801, Jul. 7, 1978, abandoned.

[51] Int. Cl.³ .............................................. G01N 29/04
[52] U.S. Cl. ........................................ 73/602; 73/642
[58] Field of Search ......................... 73/642, 596, 602

[56] References Cited

U.S. PATENT DOCUMENTS

| | | | |
|---|---|---|---|
| 3,133,445 | 5/1964 | Richard | 73/596 |
| 3,367,173 | 2/1968 | Uphoff | 73/596 |
| 3,968,680 | 7/1976 | Vopilkin | 73/642 |
| 4,016,750 | 4/1977 | Green | 73/602 |

FOREIGN PATENT DOCUMENTS 1278541 6/1972 United Kingdom .
1418614 12/1975 United Kingdom .

OTHER PUBLICATIONS

L. Bergmann, Der Ultraschall, Hirzel-Verlag, Stuttgart 1954, 6, Auflage, Seite 716, 717.
J. Matauschek, Einführung in die Ultraschalltechnik, VEB-Verlag Technik, Berlin 1962, Seiten 233 bis 236.

*Primary Examiner*—Anthony V. Ciarlante
*Attorney, Agent, or Firm*—Toren, McGeady and Stanger

[57] ABSTRACT

A method and device for generating acoustic pulses, preferably ultrasonic, and the use of such pulses, more particularly for non-destructive material testing. The acoustic pulses are produced by a modulation or multiplication technique.

13 Claims, 6 Drawing Figures

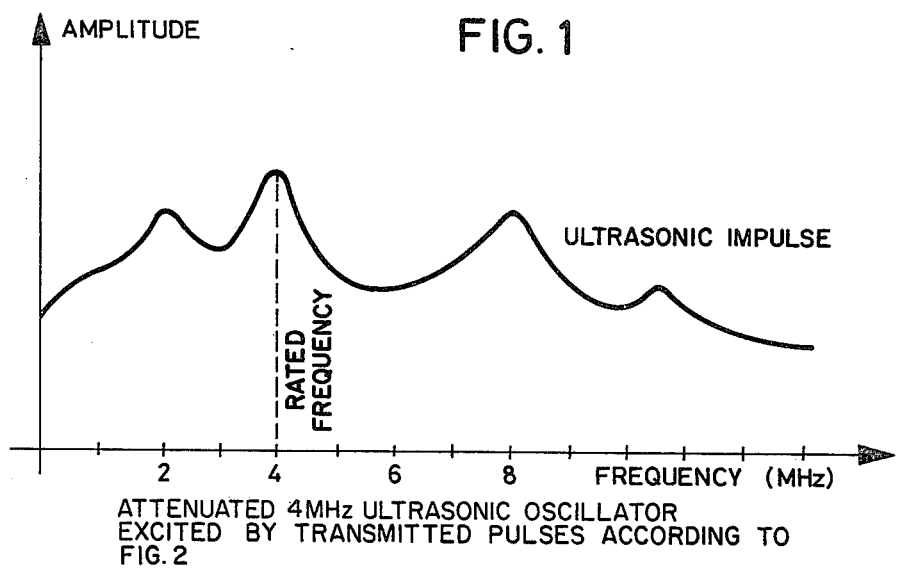
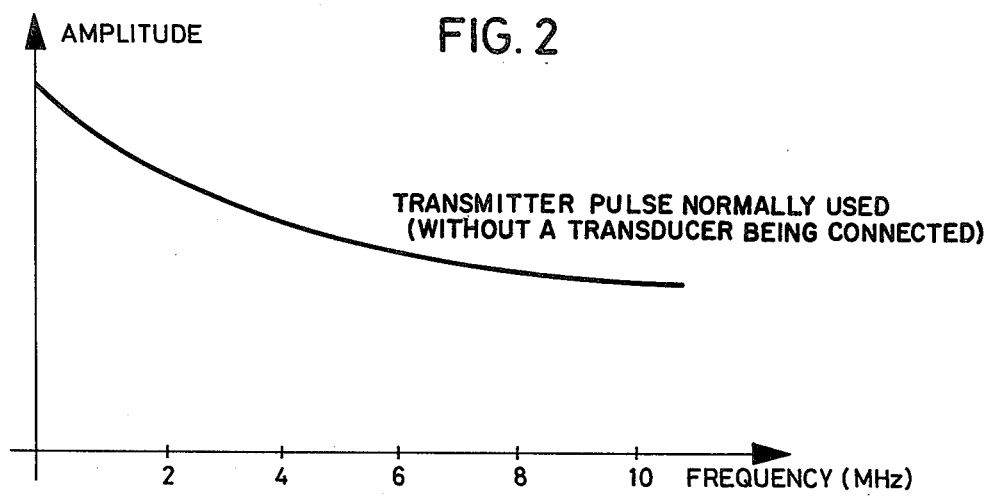

METHOD AND DEVICE FOR GENERATING ACOUSTIC PULSES

This is a continuation of application Ser. No. 922,801, filed July 7, 1978 now abandoned.

FIELD OF THE INVENTION

The invention relates to a method and device for generating acoustic pulses, preferably in the ultrasonic region, and the use of such pulses for non-destructive material testing, e.g. in spectrometry, medical ultrasonic diagnosis and in other branches of sonic and ultrasonic pulse technology. The range of application extends to all methods and devices wherein various kinds of acoustic transducers are excited by voltage pulses.

BACKGROUND OF THE INVENTION

Acoustic pulses, more particularly ultrasonic pulses, are used mainly for testing and diagnosis during pulse reflection operation. Ultrasonic pulses are usually generated as follows: A system capable of oscillating, e.g. a piezoelectric, magnetostrictive or electric transducer, is excited by a short impulse voltage, e.g. a steep pulse, at one side. The result, depending on whether the transducer is acoustically irradiated or damped, is an acoustic pulse which can be analyzed by the Fourier method into superposed sinusoidal individual oscillations of varying frequency. The frequency spectrum of a thus-produced pulse, which has to be determined and measured, has a maximum at or near the natural frequency of the transducer if the acoustic irradiation is suitable, but comprises a relatively wide region containing marked maxima and minima. This phenomenon is all the more noticeable in proportion to the shortness of the exciting transmitter pulse. FIG. 1 illustrates a typical spectral distribution for the ultrasonic signal of a damped ultrasonic test head (natural frequency of oscillator 4 MHz) when pulses are excited in known manner, e.g. in accordance with FIG. 2.

The behaviour of ultrasonic pulses interacting with the material depends on the frequency of oscillation or on the wavelength $\lambda$, which is obtained from the relation $$c = f \cdot \lambda \qquad \lambda = \frac{c}{f}$$

In this formula, c is the speed of sound in the medium in question and f is the frequency. The speed of sound c, in the case of longitudinal and transverse waves, is a constant specific to the material. The behaviour of sound in the material in turn determines the result or test values and provides criteria for judging the test results. Consequently, ultrasonic testing and diagnosis are frequently adversely affected if the acoustic pulse has a large band width, since the criteria for evaluating the test data cannot be sufficiently clearly defined.

The wavelength and, consequently, the frequency determine e.g. the geometry of the sonic field, i.e. the short-range field and the divergence angle in the remote radiation field. There is also a relation between the wavelength and the strength of the reflection at inhomogeneities and interfaces between different media. In addition, the attenuation and scattering of sound are dependent on wavelength. These values influence important parameters of ultrasonic testing and diagnosis. In the AVG diagrams, for example, . . . the relation between an idealised equivalent error (a circular reflector perpendicular to the sound incidence), the amplification required for a particular display on the screen of an ultrasonic test device and the distance between the test head and reflector relative to the length of the short-range field, which is dependent on the wavelength. Accordingly, there are considerable limitations to the use of AVG diagrams in describing the behaviour of broad-band transducers. Similar limitations apply to focusing test heads. The focal distance is dependent on wavelength and consequently is not clearly defined in the case of broad-band test heads. A clearly defined focal length can be obtained only by using narrow-band or monochromatically oscillating test heads. The focal length can be varied as required, by varying the frequency of oscillation.

The existence of guided waves (e.g. plate and tubular waves) is also dependent on the geometry of the test-pieces at the frequency of sound. Accordingly, wide-band acoustic irradiation is also unsuitable for producing the last-mentioned waves.

In material testing, cases occur where the reflector signal which is to be detected, e.g. a fault in a weld seam, is disguised or even overlaid by scattered reflections from the surrounding structure. The reflections from the structure become greater in inverse proportion to the ratio of the wavelength to the particle size. They thus become stronger if there are more high-frequency sound components in the transmitted pulse. As a result, the rated frequency of the oscillator has to be reduced, in order to keep the broad frequency band out of the high-frequency region and thus improve the ratio between the reflection of faults and the reflection of the structure. However, when the rated frequency is reduced, it also becomes more difficult to detect small reflections. It would therefore be advantageous to vary the bead width instead of the rated frequency, in order to improve the ratio between reflections of faults and reflections from the structure.

Theoretically, monochromatic oscillation can be obtained by exciting a transducer by a d.c. train of infinite duration. In pulse reflection methods, however, the exciting voltage train must be short, since reflected pulses cannot be received during transmission. If, however, the voltage train is switched on and off, the oscillation is overlaid by building-up and dying-out transient processes, which can be explained on the basis of the mass and spring forces of the transducer system. These building-up and dying-out processes have an effect on the frequency spectrum of the generated pulse which increases with the shortness of the monochromatic a.c. voltage train.

SUMMARY OF THE INVENTION

An object of the invention, therefore, is to provide a method of shaping the pulses exciting the transducer so that the building-up and dying-out processes occur in a defined manner, so that ultrasonic and other acoustic pulses having a defined, calculated spectral distribution can be generated, more particularly pulses having a frequency band which is so narrow that it can be regarded as almost monochromatic for practical purposes, and pulses having a given broad-band frequency spectrum, which are advantageous in many cases. In addition, the invention is a successful attempt to keep the transducer-exciting oscillations variable not only relative to the precalculated frequency distribution of the generated acoustic pulses but also with regard to the fundamental oscillation frequency and duration of these pulses, so that, by means of a single transducer, the behaviour of different pulses at varying frequency can be observed in relation to one another, which may result in improvements in certain ultrasonic test methods.

The method according to the invention is characterised in that the pulses for exciting the transducer are produced by amplitude modulation or multiplication of a monochromatic a.c. voltage train at the desired test frequency (the fundamental oscillation) by at least one voltage pulse (the modulation oscillation), having a frequency, shape, exponent and duration which are adjusted so that the resulting integral of the fundamental oscillation, the modulation oscillation, the transducer characteristic and other transfer terms, give the desired frequency spectrum for the acoustic signal.

Modulation is preferably brought about by means of a rectangular, triangular, sinusoidal (1-cos ω t) or exponential (i.e. Gaussian) pulse having a wavelength greater than that of the voltage train to be modulated. Pulses of the aforementioned kind can be chosen with different exponents.

The device according to the invention is characterised in that the transmitter circuit for exciting the acoustic transducer comprises at least one pulse-shaping oscillator producing oscillations which are broken up into pulses by the pulse-sequence oscillator and supplied to at least one amplitude modulator or modifier in which the fundamental oscillation supplied by a test-frequency oscillator is superposed.

Preferably a pulse-shaper is inserted between the pulse-shaping oscillator and the amplitude modulator or multiplier, and provides the modulation pulse with a preferably adjustable exponent.

Another feature of a transmitter circuit according to the invention is a pulse duration oscillator operating at the same phase and frequency as the pulse-shaping oscillator and ensuring exact maintenance of the preferably adjustable pulse duration, the pulse duration oscillator acting via the pulse sequence oscillator to control a gate circuit for the impedance jump, the gate circuit being upstream of the transmitter and stage which is to be amplified.

Preferably the fundamental oscillation frequency (i.e. the test frequency) is steplessly adjustable, irrespective of the width of the frequency spectrum, which can also be adjusted, preferably steplessly, by means for adjusting the frequency, shape and exponent of the modulation oscillation.

Other features of the invention will be clear from the sub-claims in conjunction with the following description and drawings.

BRIEF DESCRIPTION OF THE DRAWINGS

In the drawings:

FIG. 1 illustrates a typical spectral distribution of a damped ultrasonic test head when pulses are excited in known manner, FIGS. 2–5 show the typical spectral distribution of a damped ultrasonic test head whose oscillator has a neutral frequency of 4 MHz, when the test head is excited by a pulse modulated according to the invention.

DESCRIPTION OF THE PREFERRED EMBODIMENTS

Figure 3:
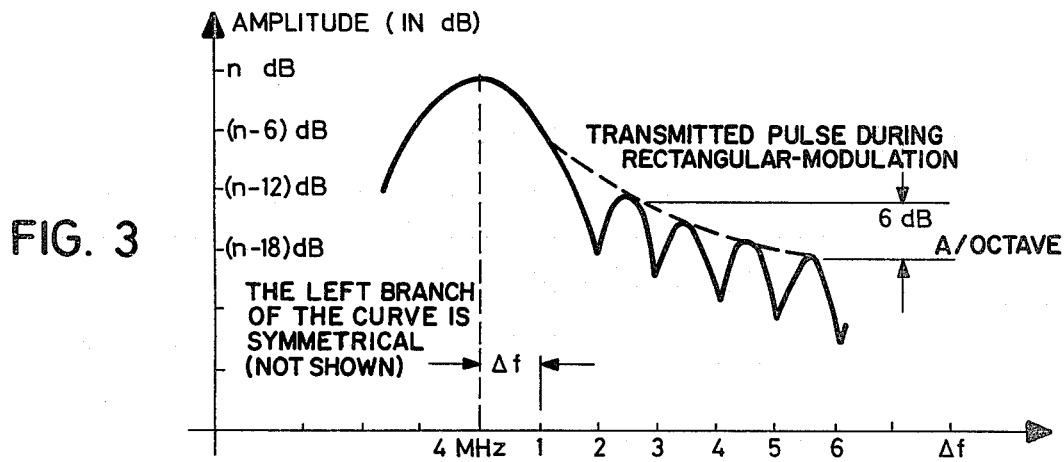
Figure 4:
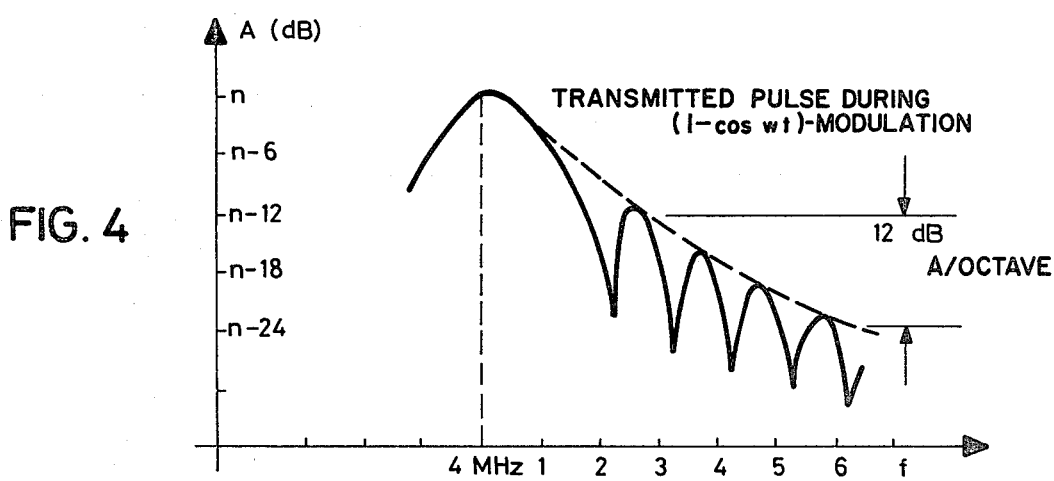
Figure 5:
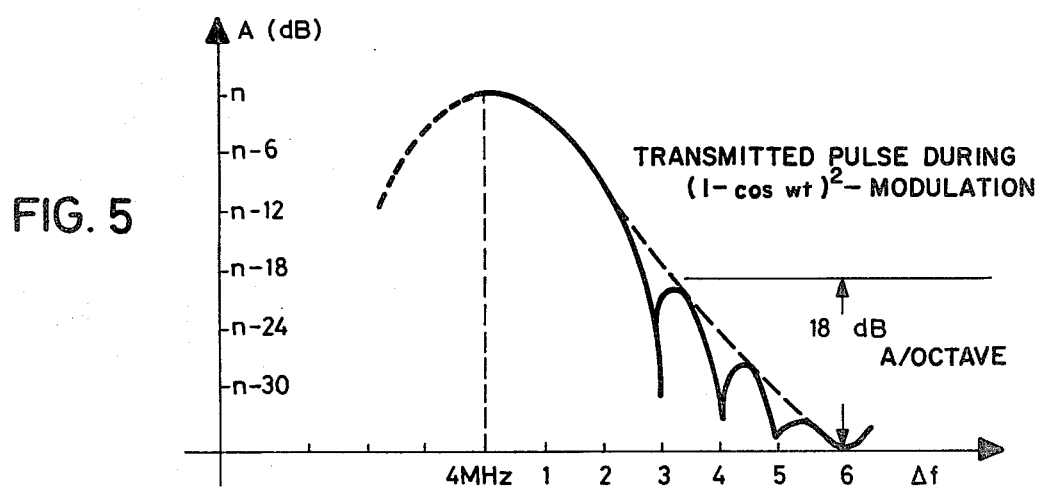
Figure 6:
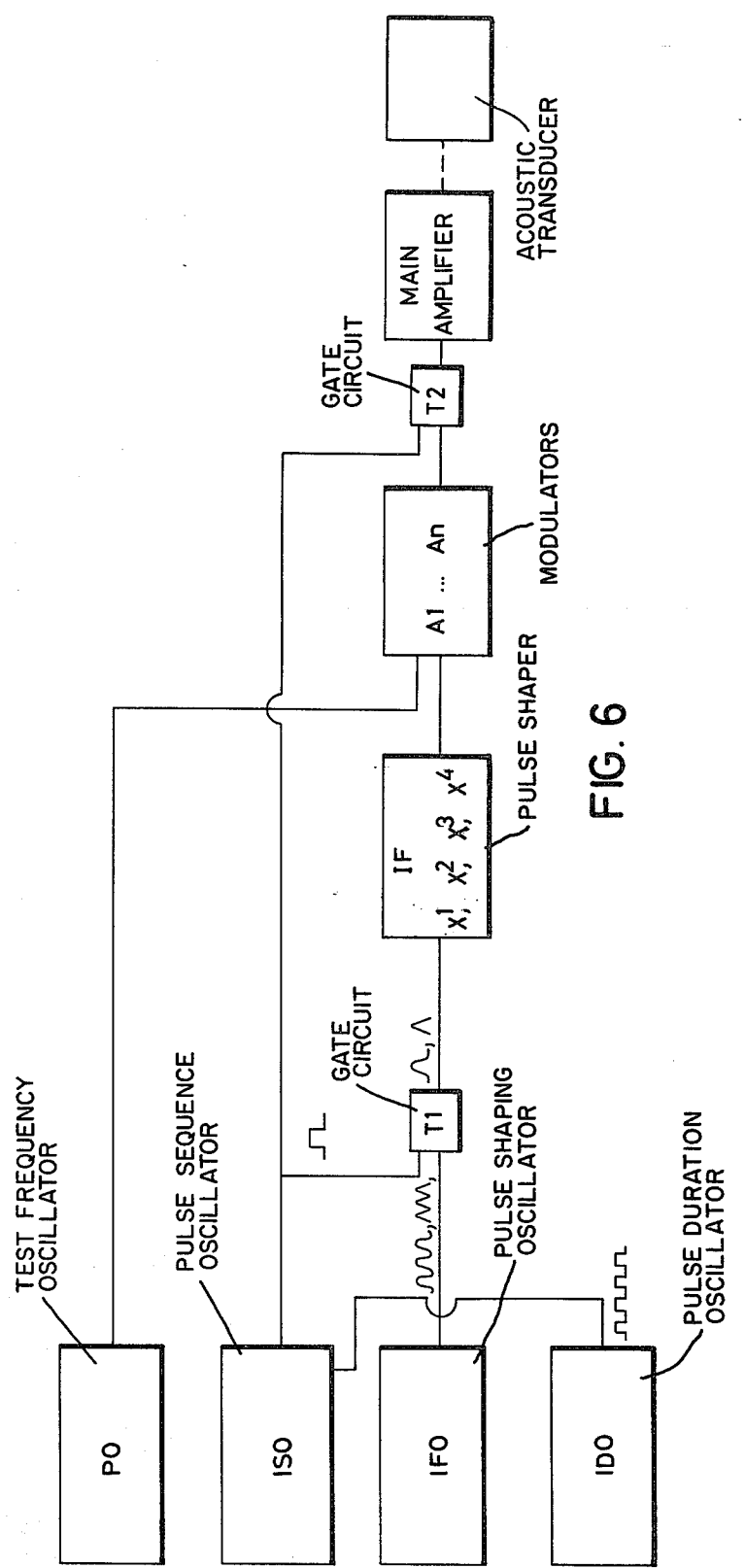
FIG. 6 is a block circuit diagram of a device according to the invention.

Pulses for exciting an ultrasonic test head are generated by a transmitter circuit shown by way of example in FIG. 6. In the process, an adjustable test-frequency oscillator PO generates a monochromatic a.c. voltage train at the test frequency, which is modulated or multiplied in a number of modulators A1 . . . An by a voltage pulse generated by a pulse-shaping oscillator IFO and provided with a variable exponent in a pulse-shaper IF, after which the monochromatic a.c. voltage train is supplied to the transducer in order to excite it. The frequency spectrum of the transmitted signal is the convolution integral over the fundamental oscillation and the modulation or multiplication. Each process in the form of pulses results in an infinite number of frequencies in the spectral region. In the case of finite pulses, zero positions are produced and periodically returned with the pulses. If continuous oscillations, e.g. rectangular, triangular, saw-tooth, sinusoidal or trapezoidal oscillations are used for modulation, predetermined zero points and maxima result in the frequency spectrum, as shown in FIGS. 3–5. FIG. 3 shows the typical spectral distribution upon excitation with a 4 MHz voltage train with rectangular modulation, FIG. 4 shows the typical voltage distribution on excitation with a 4 MHz voltage train with (1-cos ω t) modulation and FIG. 5 shows the typical voltage distribution upon excitation with 4 MHz voltage train with (1-cos ω t) modulation. The side-band oscillation maxima decrease in a predetermined manner from the main maximum of the exciting frequency. The decrease is 6 dB per octave for a rectangular pulse, 12 dB for a triangular pulse and 18 dB for a sinusoidal (1-cos ω t) pulse. The absolute value of Δ F is given or can be chosen on the basis of the pulse length. These functions can be repeatedly superposed, to produce an even steeper drop and thus a further narrowing of the frequency spectrum. The same applies to exponential modulation, although no zero positions are produced. Provided the transmitter spectrum has a narrower band than the frequency characteristic of the transducer and receiver, all the downstream components transmit the pulse with substantially no distortion. In that case, the ultrasonic pulse has practically the same frequency spectrum as the transmitted pulse. Predetermined wideband excitation can be obtained by the reverse procedure.

The modulation pulse is produced by the circuit in FIG. 6 as follows: A pulse-sequence oscillator ISO triggers a gate circuit T1 which on each occasion lets through an oscillation of the pulse-shaping oscillator IF0. The oscillation can be triangular or sinusoidal or (1-cos ω t) shaped. Each pulse transmitted by the gate circuit T1 is provided with an exponent in the downstream pulse-shaping device. Since the pulse-shaper is adjustable, the pulse can be varied (exp 1, 2, 4 n). The pulse from the pulse-shaper IF reaches a number of amplitude modulators A1 . . . An, in which the fundamental oscillation generated in the test oscillator and likewise supplied to modulators A1 . . . An is superposed. An additional gate circuit T2 comprising a pulse duration oscillator ID0, which operates at the same phase and frequency as the pulse-shaping oscillator IF0, insures exact maintenance of the pulse duration and of the change in impedance required for matching the transducer. The entire pulse is amplified in an end stage and matched to the transmitter head.

The following adjustments can be made in the previously-described transmitter:

(1) Adjustment of the frequency of the fundamental oscillation a.c. train (2) Adjustment of the amplitude of the fundamental oscillation, i.e. the transmitted power at the pulse-frequency oscillator;

(3) Adjustment of the frequency of the modulation oscillation, i.e. the pulse duration at the pulse-duration oscillator;

(4) Adjusting the shape of the modulation oscillation (i.e. rectangular, triangular, sinusoidal or (1-cos ω t) at the pulse-shaping oscillator, and (5) Adjusting the modulation exponent to the pulse-shaper IF.

By means of these adjusting facilities, the width of the frequency spectrum of the test pulse can be steplessly adjusted by varying the exciting pulse. Similarly, the fundamental frequency and the total duration of the test pulse can be adjusted; the pulse frequency spectrum is predetermined and can thus be made narrow, i.e. almost monochromatic in the technical sense, or wide, e.g. as required for producing a shock wave.

The transmitter circuit according to the invention can be used for sonic spectrometry, wherein narrow-band transmitted pulses of varying frequency are compared with regard to their reflection behaviour. Hitherto, transmission has been on a broad band and the received pulses have been analyzed. By means of the invention, pulses having varying spectral distribution of varying frequencies can be transmitted immediately after one another or in rhythmic sequences, so that the reflectors can be given greater discriminating power.

In addition, the frequency of a narrow-band transmitted pulse can be chosen to obtain the optimum ratio between the reflection of structure and the reflection of faults, i.e. the signal-to-noise ratio. In the last-mentioned device, the possible narrowness of the band and also the possibility of selecting the frequency have a good effect.

Since the test frequency is adjustable, the method and device according to the invention are also particularly suitable for generating guided waves and for supplying focusing test heads having a predetermined and/or variable focal length.

More particularly, the invention can be used to construct narrow-band test heads, the behaviour of which can be clearly defined by means of AVG diagrams. The test heads, however, can also operate in the wide-band region and the test frequency and pulse duration are steplessly adjustable.

As indicated above, a device for generating acoustic pulses, preferably in the ultrasonic region, comprises an acoustic transducer, a transmitter circuit for generating pulses for exciting the acoustic transducer including at least one pulse-shaping oscillator for producing oscillations, a pulse sequence oscillator which receives the oscillations and which break up the oscillations into pulses, a test frequency oscillator, and an amplitude modulator responsive to the pulses for superimposing the fundamental oscillation generated by the test frequency oscillator for modulating the pulses.

The invention also includes the device as set forth above wherein the pulse-shaping oscillator generates continuous rectangular, triangular, sinusoidal (1-cos ω t) or exponential-shaped oscillations having a wavelength greater than or equal to that of the voltage train which is to be modulated. The device further may include a pulse-shaper which is upstream of the amplitude modulator and provides the modulation pulse with a variable exponent.

In another example of the device according to the invention, the device includes a pulse duration oscillator operating at the same phase and frequency as the pulse-shaping oscillator for ensuring that a preferably adjustable pulse duration is maintained and also includes a gate circuit; the pulse-shaping oscillator acts via the pulse sequence oscillator to control the gate circuit for the impedance jump, the gate circuit being provided upstream of the amplifying transmitter end stage.

The device according to the invention has an arrangement wherein the pulse-shaping oscillator, the pulse sequence oscillator, the pulse duration oscillator and the pulse shaper are adjustable so that the width of the frequency spectrum of the acoustic pulse can be steplessly adjusted. The device may also include an arrangement wherein the test frequency oscillator is adjustable, preferably steplessly, for producing modulation pulses, independently of the circuit units.

In accordance with the method of the present invention, the method may also include the step of using the method for supplying test heads for generating guided waves. Further, the method may include the step of using the method for a test head which is rhythmically excited to produce narrow-band pulses of varying frequency, the reflection of which is investigated.

Finally, the method may include the step of using the method for optimizing the test frequency so that the frequency of a narrow-band transmitter pulse is adjusted to an optimum signal-to-noise-ratio.

I claim:

1. In a method of generating acoustic pulses, preferably in the ultrasonic region, wherein an acoustic transducer is excited by voltage pulses, said acoustic pulses subject to Fourier integral analysis to determine whether a desired frequency spectrum has been achieved, the improvement comprising the steps of:
providing a monochromatic a.c. voltage train at a desired test frequency;
providing at least one voltage pulse;
producing pulses for exciting the transducer by amplitude modulation or multiplication of said monochromatic a.c. voltage train (the fundamental oscillation) by said voltage pulse (the modulation oscillation); and
adjusting said voltage pulse to have a frequency, shape, exponent and duration so that the corresponding Fourier integral of the fundamental oscillation, the modulation oscillation, transducer characteristic and transfer terms associated with the signal path, provide a desired frequency spectrum for the acoustic signal.

2. A method according to claim 1, wherein the modulation is by means of a rectangular, triangular, sinusoidal (1-cos ω t) or exponential-shaped pulse (e.g. a Gaussian pulse) having a wavelength greater than that of the voltage train to be modulated.

3. A method according to claim 2, wherein modulation is by pulses having different exponential forms.

4. The method of claim 1, including the step of using said method for supplying focusing test heads having a given and/or variable focal length.

5. The method of claim 1, including the step of using said method for supplying test heads for generating guided waves.

6. The method of claim 1, including the step of using said method for a test head which is rhythmically excited to produce narrow-band pulses of varying frequency, the reflection of which is investigated.

7. The method of claim 1, including the step of using said method for optimizing the test frequency so that the frequency of a narrow-band transmitter pulse is adjusted to an optimum signal-to-noise ratio.

8. A device for generating acoustic pulses, preferably in the ultrasonic region, comprising:

an acoustic transducer;

a test frequency oscillator for providing a monochromatic a.c. voltage train at a desired test frequency;

a pulse-shaping oscillator for producing oscillations;

a pulse sequence oscillator for providing control signals;

means responsive to said pulse sequence oscillator and said pulse-shaping oscillator for extracting pulses from said oscillations;

an adjustable pulse shaper responsive to said pulses for shaping said pulses; and an amplitude modulator responsive to said shaped pulses for modulating or multiplying said a.c. voltage train (the fundamental oscillation) with said shaped pulses (the modulation oscillation) for providing a pulse for exciting said acoustic transducer, the wavelength of said modulation oscillation being equal to or greater than the wavelength of said fundamental oscillation; whereby the frequency spectrum of the acoustic pulse may be controlled by adjustment of said pulse shaper.

9. A device according to claim 8, wherein said pulse-shaping oscillator generates continuous rectangular, triangular, sinusoidal (1-cos $\omega$ t) or exponential-shaped oscillations having a wavelength greater than or equal to that of the voltage train which is to be modulated.

10. A device according to claim 8, wherein said pulse-shape provides the modulation pulse with a variable exponent.

11. A device according to claim 8, including a pulse duration oscillator operating at the same phase and frequency as the pulse-shaping oscillator for ensuring that a preferably adjustable pulse duration is maintained and also including a gate circuit and an amplifying end stage, the pulse-shaping oscillator acting via the pulse sequence oscillator to control said gate circuit for the impedance jump, the gate circuit being provided upstream of the amplifying end stage.

12. A device according to claims 10 or 11, wherein the pulse-shaping oscillator, the pulse sequence oscillator, the pulse duration oscillator and the pulse shaper are adjustable so that the width of the frequency spectrum of the acoustic pulse can be steplessly adjusted.

13. A device according to claim 8, wherein the test frequency oscillator is adjustable, preferably steplessly, for producing modulation pulses, independently of the other circuit units.

* * * * *

UNITED STATES PATENT OFFICE
CERTIFICATE OF CORRECTION

Patent No. 4,271,705  Dated June 9, 1981

Inventor(s) Horst-Artur Crostack

It is certified that error appears in the above-identified patent and that said Letters Patent are hereby corrected as shown below:

In the heading of the patent [73] should read as follows:

[73] Karl Deutsch Prüf-und Messgerätebau
Wuppertal, Fed. Rep. of Germany

Signed and Sealed this

Twentieth Day of October 1981

|SEAL|

Attest:

Attesting Officer

GERALD J. MOSSINGHOFF

Commissioner of Patents and Trademarks